(12) United States Patent
Damian et al.

(10) Patent No.: US 6,749,217 B2
(45) Date of Patent: Jun. 15, 2004

(54) AIR BAG ASSEMBLY PROVIDING ADJUSTABLE CUSHION DEPTH

(75) Inventors: Steven Aurel Damian, Springboro, OH (US); Robert Raymond Niederman, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 55 days.

(21) Appl. No.: 10/273,235

(22) Filed: Oct. 17, 2002

(65) Prior Publication Data

US 2004/0075261 A1 Apr. 22, 2004

(51) Int. Cl.[7] ............................................. B60R 21/32
(52) U.S. Cl. ..................... 280/734; 280/743.2; 280/735
(58) Field of Search ................................ 280/733, 735, 280/743.1, 743.2, 734

(56) References Cited

U.S. PATENT DOCUMENTS

| | | | |
|---|---|---|---|
| 5,125,682 A | 6/1992 | Hensler et al. | 280/730 |
| 5,253,892 A | 10/1993 | Satoh | 280/731 |
| 5,308,113 A | 5/1994 | Moriset | 280/743 |
| 5,489,119 A | 2/1996 | Prescaro et al. | 280/743.2 |
| 5,762,367 A | 6/1998 | Wolanin | 280/736 |
| 5,806,883 A | 9/1998 | Cuevas | 280/731 |
| 5,826,901 A | 10/1998 | Adomeit | 280/728.2 |
| 5,887,892 A | 3/1999 | Burdack et al. | 280/731 |
| 5,887,894 A | 3/1999 | Castagner et al. | 280/743.2 |
| 6,076,854 A | 6/2000 | Schenck et al. | 280/743.2 |
| 6,120,057 A | 9/2000 | Adomeit et al. | 280/731 |
| 6,168,187 B1 | 1/2001 | Yamada et al. | 280/728.3 |
| 6,180,207 B1 | 1/2001 | Preisler et al. | 428/139 |
| 6,247,724 B1 | 6/2001 | Jambor et al. | 280/731 |
| 6,254,121 B1 | 7/2001 | Fowler et al. | 280/729 |
| 6,334,627 B1 | 1/2002 | Heym et al. | 280/743.2 |
| 6,390,501 B1 | 5/2002 | Greib et al. | 280/743.2 |
| 6,422,597 B1 | 7/2002 | Pinsenschaum et al. | 280/735 |
| 6,454,300 B1 | 9/2002 | Dunkle et al. | 280/742 |
| 6,513,835 B2 * | 2/2003 | Thomas | 280/743.2 |
| 6,561,545 B2 * | 5/2003 | Greib et al. | 280/743.2 |
| 6,581,964 B2 * | 6/2003 | Braunschadel | 280/743.2 |
| 6,592,146 B2 * | 7/2003 | Pinsenschaum et al. | 280/743.2 |
| 6,648,371 B2 * | 11/2003 | Vendely et al. | 280/739 |

* cited by examiner

Primary Examiner—Paul N. Dickson
Assistant Examiner—Toan To
(74) Attorney, Agent, or Firm—Scott A. McBain (57) ABSTRACT

An air bag assembly utilizing a releasable anchoring structure operatively connected to one or more extendible tethering elements and providing adjustable cushion depth. A displaceable support element selectively engages or disengages the anchoring structure during operation of the vehicle taking into account steady-state inputs such as vehicle velocity, occupant size, seating position, and seat-belt use. The displaceable support element may be automatically engaged or disengaged from the anchoring structure as occupant and/or driving conditions change prior to actual air bag deployment.

22 Claims, 7 Drawing Sheets

AIR BAG ASSEMBLY PROVIDING ADJUSTABLE CUSHION DEPTH

TECHNICAL FIELD

The present invention relates generally to an air bag assembly. More specifically, the present invention relates to an air bag assembly utilizing one or more extendible tethering elements providing adjustable cushion depth. The tethering elements are held in anchored relation to a support structure adapted to be selectively secured against withdrawal during air bag deployment depending upon vehicle and occupant conditions.

BACKGROUND OF THE INVENTION

It is well known to provide an air bag assembly including an inflatable cushion for protecting one or more occupants of a transportation vehicle. In an automotive vehicle, such air bag assemblies are typically positioned within the hub of the steering wheel and within a recess in the instrument panel so as to protect occupants seated in opposing relation to such assemblies. Additional air bag assemblies may be positioned within the seats and/or door panels of the vehicle for protecting the occupants during a side-impact event. It is also known to use inflatable curtain-like structures for deployment from the structural pillars and/or roof-area of the vehicle, promoting the restraint and protection of the occupants during a roll-over event.

An air bag assembly typically includes an inflatable cushion in fluid communication with a gas-emitting inflator. Upon sensing predetermined vehicle conditions, such as a given level of vehicle deceleration, the inflator discharges a fixed amount of gas, thereby forcing the cushion into a deployed position. The gas occupies the available volume within the cushion, thereby forcing the cushion to expand outwardly to the extent permitted by its construction. As an occupant comes into contact with the inflated cushion, the gas is forced out of the air bag, thereby dissipating the kinetic energy of the occupant and achieving a so-called "ride-down" effect.

It has been recognized that in some instances it may be desirable to adjust the inflation characteristics of the air bag to reflect the nature of the impact event, the size of the occupant (height and/or weight), the seating position of the occupant, and/or the seat-belt use/non-use of the occupant to be protected. In order to provide a degree of control over the pressure within the air bag, it is known to use an inflator that has varying levels or stages of gas output associated with the sensing of different vehicle and/or occupant conditions. Thus, it is known to utilize so-called "dual-stage" inflators. These dual-stage inflators, however, are more complex than typical inflators and are capable of providing only discrete levels of gas output.

In order to provide additional control over the inflation characteristics of the air bag it has been suggested to utilize extendible tethering elements in the form of straps or webs spanning the surfaces of the air bag that may be released from a first restrained operative length to a second extended operative length upon the occurrence of vehicle and/or occupant conditions warranting an increased air bag profile. It has also been suggested to utilize cushions that incorporate sewn or woven seams to control the expanded geometry of the air bag, wherein the seams may separate upon the introduction of pressures exceeding a predetermined level, thereby freeing the cushion from restraints imposed by the seams at lower pressures.

SUMMARY OF THE INVENTION

The present invention provides advantages and alternatives over the prior art by providing an air bag assembly utilizing a releasable bracket structure operatively connected to one or more extendable tethering elements and providing adjustable cushion depth. A release element selectively engages or disengages the bracket structure during operation of the vehicle taking into account steady-state inputs such as occupant size, seating position, and seat-belt use. The release element may be automatically engaged or disengaged from the bracket as occupant and/or driving conditions change prior to actual air bag deployment.

According to one aspect of the invention, an air bag assembly operable for providing the cushioning restraint of a vehicle occupant during an impact event is provided. The air bag assembly includes an inflatable air bag cushion having a first expanded profile and a second expanded profile, wherein the first expanded profile is characterized by relatively less air bag cushion depth than the second expanded profile. The air bag assembly also includes a tethering element coupled to the air bag cushion, wherein the tethering element has a first configuration associated with the first expanded profile of the air bag cushion and a second configuration associated with the second expanded profile of the air bag cushion. The air bag assembly further includes a restraining assembly operatively coupled to the tethering element, wherein the restraining assembly is operable for selectively enabling/disabling the first configuration and the second configuration of the tethering element based upon steady state conditions of the vehicle and occupant to be protected.

Advantageously, the air bag assembly of the present invention provides a relatively simple, cost-effective, and highly reproducible mechanism for controlling and adjusting the inflation characteristics of an air bag cushion.

BRIEF DESCRIPTION OF THE DRAWINGS

The present invention will now be described by way of example only, with reference to the accompanying drawings which constitute a portion of the specification herein and in which.

While the present invention has been illustrated and generally described above and will hereinafter be described in conjunction with certain potentially preferred embodiments, procedures, and practices, it is to be understood that in no case is the invention to be limited to such illustrated and described embodiments, procedures, and practices. On the contrary, it is intended that the present invention shall extend to all alternatives, modifications, and equivalents as may embrace the principles of the present invention within the true scope and spirit thereof.

DESCRIPTION OF THE PREFERRED EMBODIMENT

Reference will now be made to the drawings, wherein, to the extent possible, like reference numerals are utilized to designate like components throughout the various views.

Figure 1:
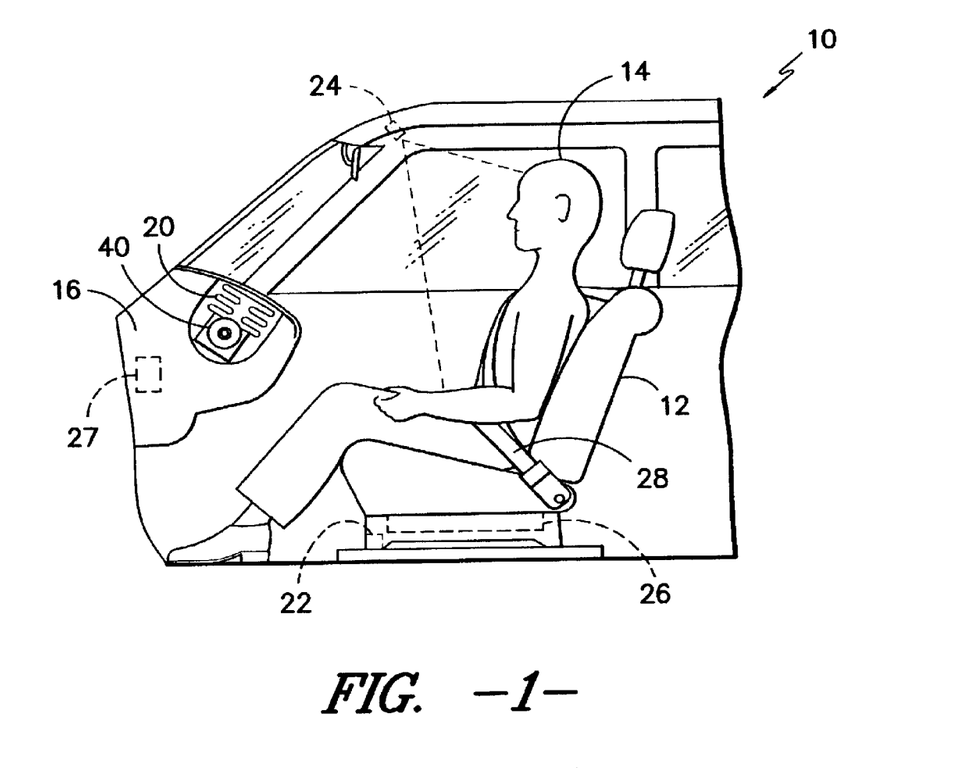
FIG. 1 is a cut-away view of a vehicle interior showing an exemplary embodiment of an air bag cushion in an undeployed, stored state in opposing relation to a vehicle occupant.

Referring to FIG. 1, it is seen that a vehicle 10 may include a seating structure 12 that supports an occupant 14 positioned in generally opposing relation to a dashboard panel 16. An inflatable air bag cushion 20 may be positioned partially or wholly within the dashboard panel 16 for outward deployment towards the occupant 14 in the event of a collision or the like.

While the air bag cushion 20 is illustrated for descriptive purposes in relation to a vehicle passenger, it is to be understood that the present invention is in no way intended to be limited to a passenger-side configuration. On the contrary, it is contemplated that the present invention may have equal applicability to air bag deployment in opposing relation to a vehicle operator (not shown) from a steering column (not shown), as well as in relation to air bags deployed from other regions within the interior of the vehicle 10, including, by way of example, side-impact air bags and inflatable curtain structures.

It is contemplated that the interior of the vehicle 10 may include a seat position sensor 22 operable for detecting the position of the seating structure 12 and the occupant 14 relative to the dashboard panel 16. It is also contemplated that the interior of the vehicle 10 may include additional position sensors, such as an optical sensor 24 or the like, operable for measuring the volume and/or position of the occupant 14 to be protected. It is further contemplated that the interior of the vehicle 10 may include a scale 26 disposed within the seating structure 12 operable for providing additional data regarding the mass of the occupant 14 and thus the load to which the inflatable air bag cushion 20 may be subjected. The seating structure 12 may also include one or more sensors (not shown) operable for measuring the degree to which the seating structure 12 is reclined. The interior of the vehicle 10 may still further include one or more sensors (not shown) operable for determining and communicating whether or not the occupant 14 is utilizing recommended seatbelt structures 28. The data so collected may be communicated to a controller 27 to determine desirable expanded profile and venting characteristics for the air bag cushion 20.

According to one embodiment of the present invention, the air bag cushion 20 has at least a first expanded profile and a second expanded profile that is characterized by relatively greater depth and volume than the first expanded profile. One or more extendible tethering elements 30 (FIG. 2) in the form of straps, cords or webs may be utilized to control the inflated profile of the air bag cushion 20.

Figure 2:
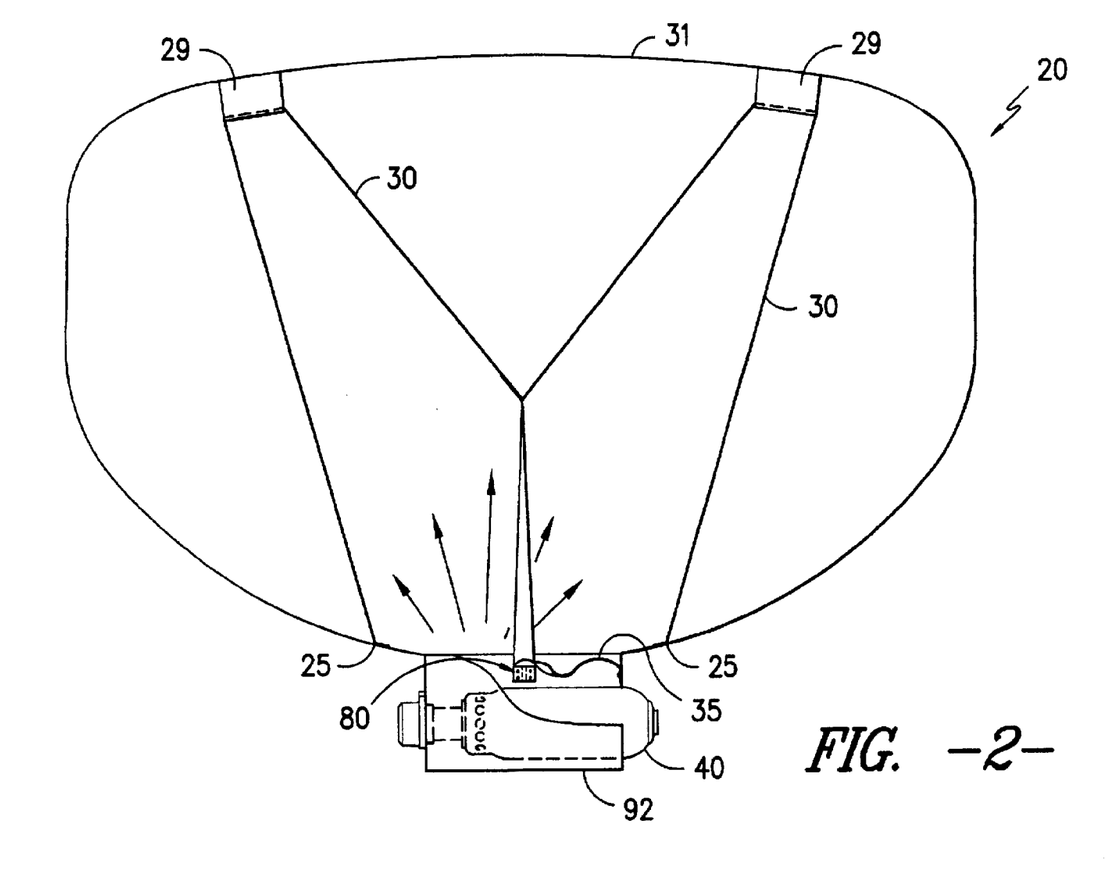
FIG. 2 illustrates an exemplary embodiment of an arrangement of profile-restricting tethers of variable effective length in an air bag cushion held in a shortened operative condition.

Referring to FIG. 2, the air bag cushion 20 is housed in fluid communication with a gas emitting inflator 40 such that upon expulsion of inflation gas by the inflator 40, the air bag cushion 30 inflates to an expanded cushioning condition. In order to contour the shape of the air bag cushion 30, one or more extendible tethering elements 30 are disposed across the interior of the air bag cushion 20 and may extend in a travel path between one or more fixed points of connection 25 at the surface of the air bag cushion 20. The tethering elements 30 may also be connected to the surface of the air bag cushion 20 at one or more predetermined positions along the travel path by one or more guide elements 29, such as at an impact face portion 31 of the air bag cushion 20. As illustrated in FIG. 2, the operative length of the tethering elements 30 may be shortened by drawing a portion of the tethering elements 30 intermediate the fixed points of connection 25 towards an anchoring structure 80 normally held at a supported fixed position remote from the air bag cushion 20.

Figure 2A:
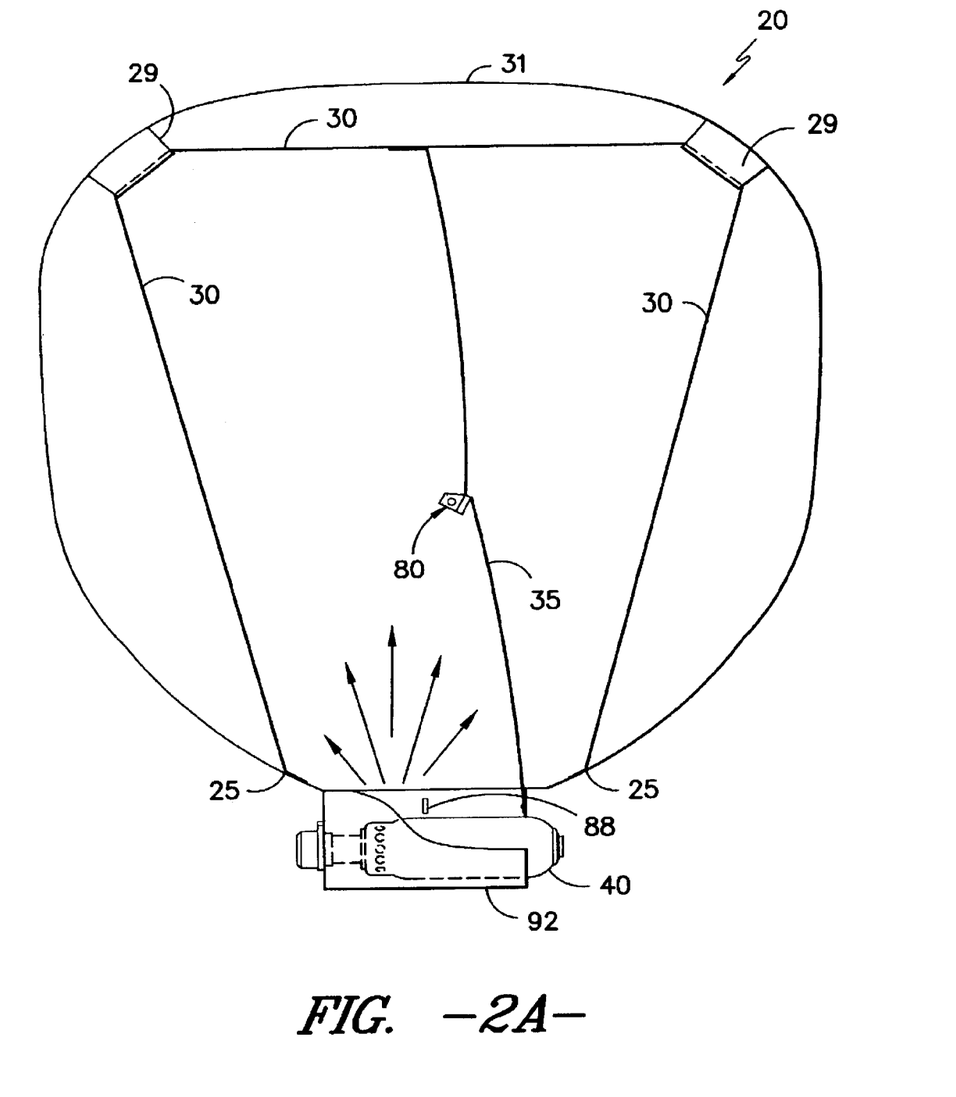
FIG. 2A is a view similar to FIG. 2 with the tethers in an extended operative condition.

The anchoring structure 80 may be selectively released or retained at its normal supported fixed position at the time of deployment of the air bag cushion 20 based upon the preferred profile of the air bag cushion 20 in light of the measured occupant and vehicle conditions. That is, if the physical character and position of the occupant 14 in combination with the nature of the impact are such that a deep profile is desired, then the anchoring structure 80 and attached tethering elements 30 are released from their supported fixed position thereby permitting the air bag cushion 20 to assume an expanded profile of increased depth (FIG. 2A). Conversely, if the physical character and position of the occupant 14 in combination with the nature of the impact are such that a shallow profile is desired, then the anchoring structure 80 and attached tethering elements remain in a static anchored position thereby restraining the air bag cushion 20 to a final profile of decreased depth (FIG. 2).

As indicated, the selective enabling/disabling of the increased and decreased profiles is preferably carried out taking into account steady-state inputs such as vehicle velocity, occupant size, occupant mass, seating position, and seat-belt use. According to the potentially preferred practice, it is contemplated that the tethering elements 30 may remain connected to the one more points of connection 25 across the surface of the air bag cushion 20. Likewise, the anchoring structure 80 may be held by a mooring line 35 secured to a fixed position of attachment remote from the anchoring structure. Such connections provide for the continued restraint of the air bag cushion 20 by the tethering elements 30 even if the anchoring structure 80 is released. That is, even with an increased operating depth, the tethering elements 30 may continue to contour the profile of the air bag cushion 20. In addition, the anchoring structure is also prevented from moving into contact with the face portion 31.

Figure 3:
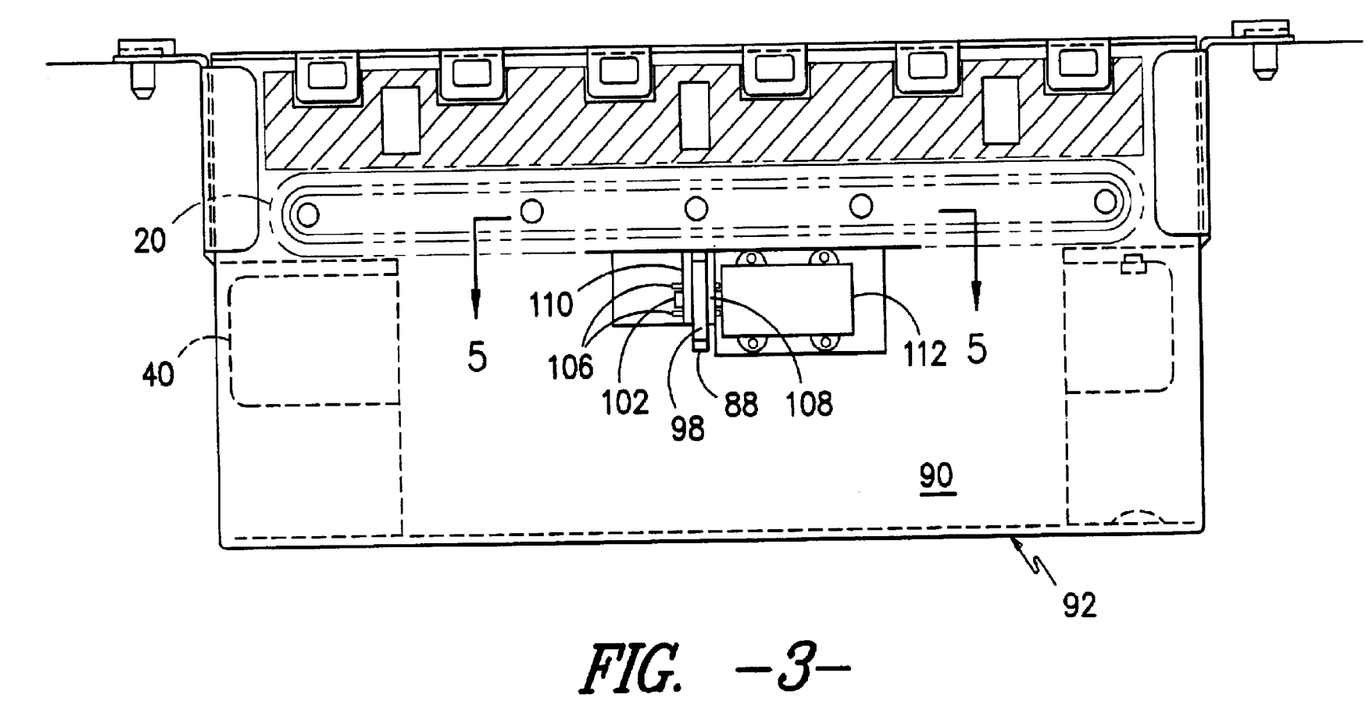
FIG. 3 illustrates an embodiment of the air bag assembly of the present invention, including a solenoid-actuated pin that selectively anchors a releasable bracket assembly relative to a module housing.
Figure 4:
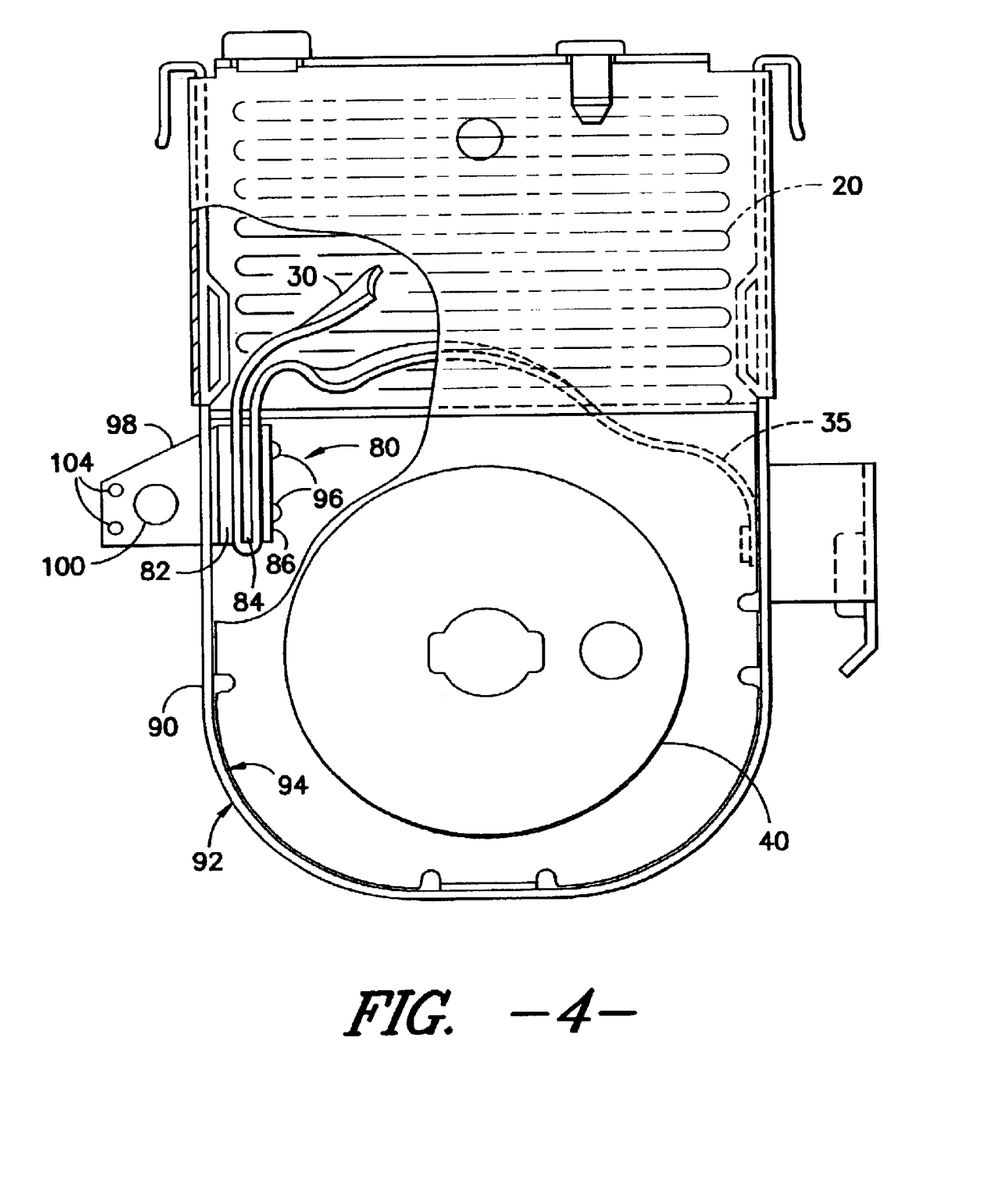
FIG. 4 is a cross-sectional view taken trough the module housing showing the releasable bracket assembly positioned within a wall of the housing.

Referring simultaneously to FIGS. 3 and 4, in one embodiment of the present invention, a tethering element 30 is connected to an anchoring structure 80 including a first plate 82, a second plate 84, and a third plate 86. The first plate 82, the second plate 84, and the third plate 86 may be made of, for example, a metal, a plastic, rubber, a composite material, or the like. The first plate 82 is positioned adjacent to a slot 88 (FIG. 3) disposed within the side portion 90 of a module housing 92. The second plate 84 is disposed within a fold in the tethering element 30 and the third plate 86 is positioned adjacent to the tethering element 30 distal to the inner surface 94 of the module housing 92 (FIG. 4). The first plate 82, the second plate 84, and the third plate 86 are connected via one or more fasteners 96 such as pins or the like inserted through the three structures and, optionally, through the tethering element 30. In the illustrated arrangement, a portion of the tethering element extends away from the anchoring structure 80 to define a mooring line 35 held at a fixed position remote from the anchoring structure 80. Of course, a separate element such as a strap, cord, wire or the like operatively secured to the tethering element and/or the anchoring structure may likewise be used to form the mooring line 35 if desired. As will be appreciated, while one exemplary attachment arrangement has been shown, any arrangement suitable for anchoring the tethering element 30 may be used.

Figure 5:
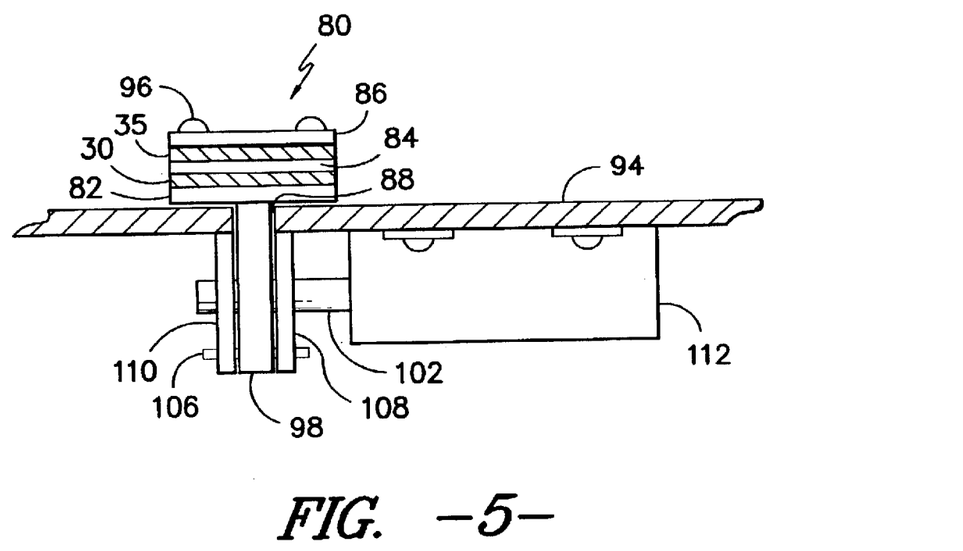
FIG. 5 is a view taken generally along line 5—5 in FIG. 3, illustrating the releasable bracket assembly in anchored position.

According to the illustrated exemplary configuration, the anchoring structure 80 includes an outwardly projecting planar release bracket 98 normally protruding through the slot 88 disposed within the side portion 90 of the module housing. As best seen in FIG. 5, in the illustrated embodiment the release bracket 98 is connected to the first plate 82 in a substantially "T" shaped geometric arrangement. The release bracket 98 may be made of a structural material such as plastic, metal or the like. The release bracket 98 preferably includes a plurality of holes 100, 104 suitable for receiving one or more pins, as described in greater detail hereinafter. By way of example only, in the exemplary embodiment illustrated, the release bracket 98 includes a primary pin hole 100 suitable for receiving a selectively extendible and retractable primary pin 102 and one or more shear pin holes 104 suitable for receiving one or more shear pins 106. Preferably, the release bracket 98 is shaped such that it may freely pass in sliding relation through the slot 88 disposed within the side portion 90 of the module housing 92.

As best seen in FIGS. 3 and 5, the slot 88 is adapted to accept the release bracket 98 between a first retention bracket 108 and a second retention bracket 10 fixedly attached to the side portion 90 of the module housing 92. The first retention bracket 108 and the second retention bracket 110 may be, for example, L-shaped brackets, each including a plurality of holes arranged for substantial alignment with the pin holes in the release bracket 98 such that the extendible and retractable primary pin 102 and the shear pins 106 may pass through the first retention bracket 110, the release bracket 98 and the second retention bracket 110.

As previously indicated, the primary pin 102 is preferably selectively retractable from an extended position engaging the release bracket and retention brackets to a withdrawn position which is out of engagement with the release bracket and retention brackets. The primary pin 102 may also be selectively reinserted through the release bracket and retention brackets. The insertion or retraction of the primary pin 102 may be achieved by the actuation of a solenoid or step motor 112 fixedly attached to the surface of the module housing 92 or at such other location as may be convenient. This actuation may be controlled by a controller 27 (FIG. 1) such as an onboard computer or the like based upon steady-state inputs such as vehicle velocity, occupant size, occupant mass, seating position, and seat-belt use acquired during driving conditions.

In operation, the presence or absence of the primary pin 102 through the release bracket 98 may be used to selectively control whether or not the anchoring structure 80 (and the associated tethering element 30) is held in place or is carried through the slot 88 and away from the housing wall. By way of example only, in the event that the measurements taken of vehicle speed, occupant size/mass, seating position, and seat-belt use characteristics dictate that a decreased air bag profile configuration is warranted, the controller 27 directs the solenoid or step motor 112 to insert the primary pin 102 through the first retention bracket 108, the release bracket 98, and the second retention bracket 110. The inserted condition of the primary pin 102 causes the anchoring structure 80, and the tethering element 30 to be held secure, and in a restrained configuration as shown in FIG. 2 despite the application of a tensioning force through the tethering element 30 as the air bag cushion 20 is inflated.

In the event that the measurements of vehicle speed, occupant size/mass, seating position, and seat-belt use characteristics dictate that an increased air bag profile configuration is warranted, the controller 27 directs the solenoid or step motor 112 to withdraw the primary pin 102 from the release bracket 98. With the primary pin 102 in the withdrawn position, the anchoring structure is supported by the shear pins 106. Under normal conditions, the support provided by the shear pins 106 is adequate to hold the release bracket 98 in place. However, in the event that the air bag cushion 20 is inflated, the tension generated through the tethering elements 30 causes the shear pins 106 to break thereby permitting the release bracket 98 to be carried away from its initial position (FIG. 2A). Due to the simplicity of insertion and withdrawal of the primary pin 102 it is contemplated that variations in occupant and/or vehicle conditions may be subject to substantially constant monitoring with insertion or withdrawal taking place as changing conditions dictate during operation over the life of the vehicle 14. Such monitoring and associated adjustment permits the air bag deployment parameters to be set and reset numerous times as conditions change in anticipation of cushion deployment thereby ensuring proper deployment character at such time as cushion deployment may be required.

Figure 6:
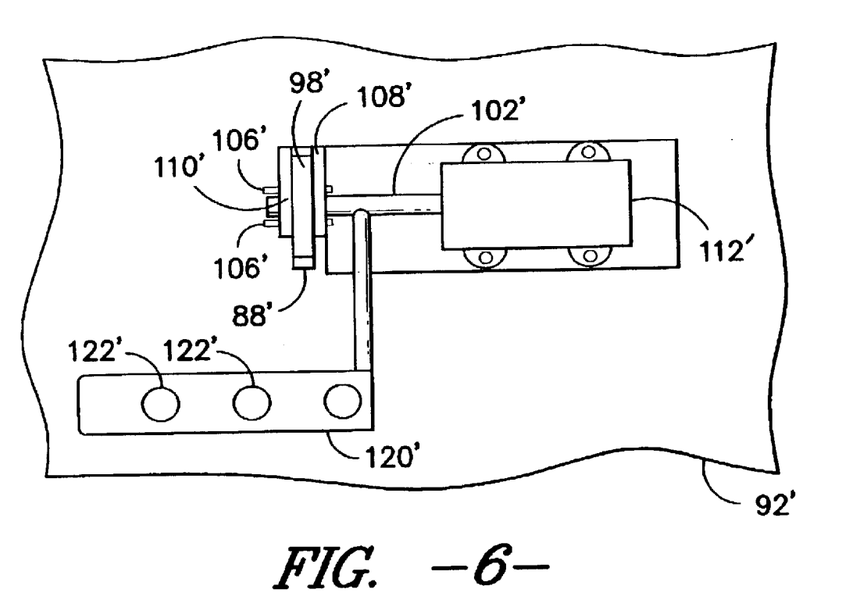
FIG. 6 illustrates an alternative bracket release assembly for use in selectively adjusting venting through the module housing in conjunction with bracket release wherein the bracket is secured in place and with vents open.
Figure 7:
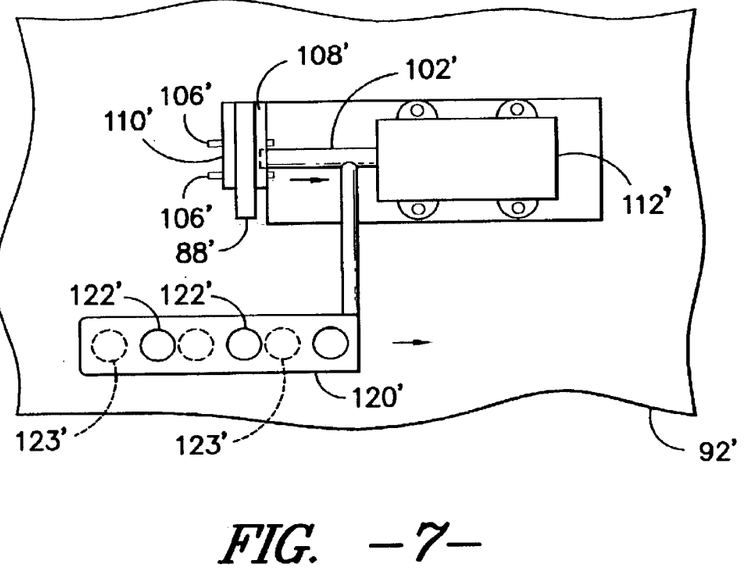
FIG. 7 is a view similar to FIG. 6 with the bracket assembly in a released condition and with vents closed.

It is contemplated that the present invention may be adaptable to a wide variety of alternative constructions. By way of example only, one alternative construction is illustrated in FIGS. 6 and 7 wherein elements corresponding to those previously illustrated and described are designated by like reference numerals with a prime. As shown, in this construction the primary pin 102' is operatively connected to a sliding vent 120' so as to adjust gas venting through the module housing 92'. As illustrated, the sliding vent 120' includes a multiplicity of vent openings 122' which are alignable with corresponding openings 123' in the module housing 92'. However, as best seen in FIG. 7, upon retraction of the primary pin 102', the vent openings 122' are shifted out of alignment with the openings 123' in the module housing thereby reducing venting capacity and directing an increased amount of inflation gas into the air bag cushion. Of course, it is also contemplated that the vent openings 122' may be initially out of alignment with the openings 123' in the module housing such that upon retraction of the primary pin 102' alignment is achieved and venting is increased. Thus, it is contemplated that venting capacity may be substantially matched to desired deployment characteristics based upon measured operational and occupant conditions.

It is to be understood that while the present invention has been illustrated and described in relation to potentially preferred embodiments, constructions and procedures, such embodiments, constructions and procedures are illustrative only and that the present invention is in no event to be limited thereto. Rather, it is contemplated that modifications and variations embodying the principles of the present invention will no doubt occur to those of ordinary skill in the art. In particular, it is to be understood that the present invention is in no way limited to any particular mechanism for the retention and/or release of extendible tethering elements and that all description of such mechanisms is exemplary and explanatory only. It is therefore contemplated and intended that the present invention shall extend to all such modifications and variations as may incorporate the broad aspects of the present invention within the true scope and spirit thereof.

What is claimed is:

1. An air bag assembly operable for providing the cushioning restraint of an occupant within a vehicle during an impact event, the air bag assembly comprising:

a gas emitting inflator disposed within a walled support container;

an inflatable air bag cushion having a first expanded profile and at least a second expanded profile, wherein the second expanded profile is characterized by relatively greater air bag cushion depth than the first expanded profile;

at least one tethering element coupled to the air bag cushion, wherein the tethering element has a first configuration associated with the first expanded profile of the air bag cushion and a second configuration associated with the second expanded profile of the air bag cushion;

an anchoring structure operatively coupled to the tethering element, wherein the anchoring structure is normally held at a fixed position prior to deployment of the air bag cushion; and a variable strength restraining assembly holding the anchoring structure in place prior to deployment of the air bag cushion, the restraining assembly comprising a displaceable support element adapted to be selectively moved between a first position operatively engaging the anchoring structure and at least a second position not engaging the anchoring structure such that when the displaceable support element is in the first position, the anchoring structure is held at said fixed position upon deployment of the air bag cushion and such that when the displaceable support element is in the second position the anchoring structure is displaceable away from said fixed position upon deployment of the air bag cushion and wherein the displaceable support element is adapted to be moved between the first position and the second position multiple times prior to deployment of the air bag cushion based upon changes in the condition of the occupant prior to deployment of the air bag cushion.

2. The air bag assembly of claim 1, wherein the anchoring structure comprises a plurality of plates positioned adjacent to one another, wherein the plurality of plates are configured to compressingly hold a portion of the tethering element.

3. The air bag assembly of claim 2, wherein the anchoring structure further comprises a releasable bracket configured to extend through a slot disposed within the walled support container and wherein the releasable bracket is configured to receive one or more pins.

4. The air bag assembly of claim 3, wherein the restraining assembly further comprises one or more retention brackets fixedly attached to the walled support container, and wherein the one or more retention brackets are configured to receive one or more pins.

5. The air bag assembly of claim 4, wherein the displaceable support element comprises a primary pin operable for engaging the releasable bracket and the one or more retention brackets, thereby holding the releasable bracket secure in relation to the one or more retention brackets.

6. The air bag assembly of claim 5, wherein the restraining assembly further comprises a solenoid coupled to the primary pin, wherein the solenoid is operable for inserting the primary pin into and retracting the primary pin from the releasable bracket multiple times.

7. The air bag assembly of claim 6, wherein the restraining assembly further comprises a step motor coupled to the primary pin, wherein the step motor is operable for inserting the primary pin into and retracting the primary pin from the releasable bracket multiple times.

8. The air bag assembly of claim 5, wherein the restraining assembly further comprises one or more shear pins operable for engaging the releasable bracket and the one or more retention brackets, thereby holding the releasable bracket secure in relation to the one or more retention brackets until a predetermined force is exerted on the one or more shear pins.

9. The air bag assembly of claim 1, wherein the restraining assembly is operable for selectively enabling/disabling the first configuration and the second configuration of the tethering element based upon a steady-state input acquired during vehicle operation.

10. The air bag assembly of claim 9, wherein the steady-state input comprises an input selected from the group consisting of at least one occupant condition and at least one vehicle condition.

11. The air bag assembly of claim 10, wherein the steady-state input comprises an input selected from the group consisting of occupant size, occupant position, occupant mass, occupant seat-belt usage, vehicle velocity and combinations thereof.

12. An air bag assembly operable for providing the cushioning restraint of an occupant within a vehicle during an impact event, the air bag assembly comprising:

a gas emitting inflator disposed within a walled support container;

an inflatable air bag cushion having a first expanded profile and at least a second expanded profile, wherein the second expanded profile is characterized by relatively greater air bag cushion depth than the first expanded profile;

at least one tethering element coupled to the air bag cushion, wherein the tethering element has a first configuration associated with the first expanded profile of the air bag cushion and a second configuration associated with the second expanded profile of the air bag cushion;

an anchoring structure operatively coupled to the tethering element, wherein the anchoring structure is normally held at a fixed position prior to deployment of the air bag cushion; and a variable strength restraining assembly holding the anchoring structure in place prior to deployment of the air bag cushion, the restraining assembly comprising a displaceable support element adapted to be selectively moved between a first position operatively engaging the anchoring structure and at least a second position not engaging the anchoring structure such that when the displaceable support element is in the first position, the anchoring structure is held at said fixed position upon deployment of the air bag cushion and such that when the displaceable support element is in the second position the anchoring structure is displaceable away from said fixed position upon deployment of the air bag cushion and wherein the displaceable support element is adapted to be moved between the first position and the second position multiple times prior to deployment of the air bag cushion based upon changes in the condition of the occupant prior to deployment of the air bag cushion; and a vent covering element operatively connected to the displaceable support element such that upon movement of the displaceable support element between the first position and the second position the vent covering element is moved relative to vent openings within the walled support container.

13. The air bag assembly of claim 12, wherein the anchoring structure comprises a plurality of plates positioned adjacent to one another, wherein the plurality of plates are configured to compressingly hold the tethering element.

14. The air bag assembly of claim 13, wherein the anchoring structure further comprises a releasable bracket configured to extend through a slot disposed within the walled support container and wherein the releasable bracket is configured to receive one or more pins.

15. The air bag assembly of claim 14, wherein the restraining assembly further comprises one or more retention brackets fixedly attached to the walled support container, and wherein the one or more retention brackets are configured to receive one or more pins.

16. The air bag assembly of claim 15, wherein the displaceable support element comprises a primary pin operable for engaging the releasable bracket and the one or more retention brackets, thereby holding the releasable bracket secure in relation to the one or more retention brackets.

17. The air bag assembly of claim 16, wherein the restraining assembly further comprises a solenoid coupled to the primary pin, wherein the solenoid is operable for inserting the primary pin into and retracting the primary pin from the releasable bracket multiple times.

18. The air bag assembly of claim 16, wherein the restraining assembly further comprises a step motor coupled to the primary pin, wherein the step motor is operable for inserting the primary pin into and retracting the primary pin from the releasable bracket multiple times.

19. The air bag assembly of claim 15, wherein the restraining assembly further comprises one or more shear pins operable for engaging the releasable bracket and the one or more retention brackets, thereby holding the releasable bracket secure in relation to the one or more retention brackets until a predetermined force is exerted on the one or more shear pins.

20. The air bag assembly of claim 12, wherein the restraining assembly is operable for selectively enabling/disabling the first configuration and the second configuration of the tethering element based upon a steady-state input acquired during vehicle operation.

21. The air bag assembly of claim 20, wherein the steady-state input comprises an input selected from the group consisting of at least one occupant condition and at least one vehicle condition.

22. The air bag assembly of claim 21, wherein the steady-state input comprises an input selected from the group consisting of occupant size, occupant position, occupant mass, occupant seat-belt usage, vehicle velocity and combinations thereof.

* * * * *